(12) United States Patent
Bose et al.

(10) Patent No.: US 10,012,749 B2
(45) Date of Patent: Jul. 3, 2018

(54) FAST MODEL BASED INVERSION OF ACOUSTIC IMPEDANCE OF ANNULUS BEHIND CASING

(71) Applicant: SCHLUMBERGER TECHNOLOGY CORPORATION, Sugar Land, TX (US)

(72) Inventors: Sandip Bose, Brookline, MA (US); Smaine Zeroug, Lexington, MA (US); Jiaqi Yang, Belmont, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 165 days.

(21) Appl. No.: 14/887,746

(22) Filed: Oct. 20, 2015

(65) Prior Publication Data
US 2016/0109605 A1    Apr. 21, 2016

Related U.S. Application Data

(60) Provisional application No. 62/066,299, filed on Oct. 20, 2014.

(51) Int. Cl.
*G01V 1/40* (2006.01)
*G01V 1/50* (2006.01)
(Continued)

(52) U.S. Cl.
CPC ............ *G01V 1/50* (2013.01); *E21B 47/0005* (2013.01); *G01V 1/306* (2013.01)

(58) Field of Classification Search
CPC . G01V 1/50; G01V 1/40; G01V 1/306; E21B 47/0005
(Continued)

(56) References Cited

U.S. PATENT DOCUMENTS 4,685,092 A * 8/1987 Dumont .............. E21B 47/0005
181/104
5,146,432 A * 9/1992 Kimball ................. G01N 29/09
367/13
(Continued)

OTHER PUBLICATIONS

S. Zeroug and N. Bounoua, "Well integrity—cement evaluation," in Sonatrach-Schlumberger Well Evaluation Conference, Algeria, 2007, pp. 5.32-5.45.
(Continued)

*Primary Examiner* — Ian J Lobo
(74) *Attorney, Agent, or Firm* — Michael Dae

(57) ABSTRACT

Techniques involve obtaining acoustic data from an acoustic logging tool, where the acoustic data includes waves reflected from the casing, the annular fill material, the formation, and/or interfaces between any of the casing, the annular fill material, and the formation. A crude casing thickness, tool position (e.g., eccentering), mud sound velocity may be estimated using the acoustic data. Techniques also involve computing a model spectra and an estimated casing thickness using a forward model and based on a crude casing thickness, an initial mud acoustic impedance, and an initial annular acoustic impedance, estimating a specular signal using the model spectra and the acoustic data in a first time window, computing a calibrated model signal using the estimated specular signal and computed model spectra, computing a misfit of the computed calibrated model signal and acoustic data in a second time window comprising the initial time window, and computing a correction update to one or more of the estimated casing thickness an estimated apparent annular acoustic impedance and an estimated mud acoustic impedance, based on the misfit. Techniques involve iteratively estimating the model spectra and the Jacobian curve, computing the specular signal, computing the misfit, and computing the update until
(Continued)

the update is below a threshold. Outputs may include one or more of a casing thickness, an apparent acoustic impedance of the annular fill material, and the acoustic impedance of mud.

20 Claims, 8 Drawing Sheets

(51) Int. Cl.
*E21B 47/00* (2012.01)
*G01V 1/30* (2006.01)

(58) Field of Classification Search
USPC .......................................... 367/35; 181/102
See application file for complete search history.

(56) References Cited

U.S. PATENT DOCUMENTS

| | | | |
|---|---|---|---|
| 5,216,638 A | | 6/1993 | Wright |
| 5,859,811 A | * | 1/1999 | Miller ...................... G01V 1/48 367/25 |
| 9,829,597 B2 | | 11/2017 | Zeroug et al. |
| 2008/0189041 A1 | * | 8/2008 | Froelich ................... G01V 1/48 702/7 |
| 2016/0061029 A1 | * | 3/2016 | Hayman ............. E21B 47/0005 73/152.18 |

OTHER PUBLICATIONS

C. Randall and F. E. Stanke, "Mathematical model for ultrasonic, internal inspection of cylindrically layered structures," J. Acoust. Soc. Am. 83, 1295-1305 (1988).

S. Zeroug, F. E. Stanke, and R. Burridge, "A complex-transducer-point model for finite emitting and receiving ultrasonic transducers," Wave Motion, vol. 24, pp. 21-40, 1996.

L. L. Foldy and H. Primakoff, "A general theory of passive linear electroacoustic transducers and the electroacoustic reciprocity theorem. i," Journal of Acoustical Society of America, vol. 17, pp. 109-120, 1945.

S. Zeroug, "Spectral integral formulae for the response of acoustic transducers in cylindrically curved configurations," IEEE Transcation on Ultrasonics, Ferroelctrics, and Frequency Control, vol. 45, No. 3, pp. 768-778, May 1998.

S. Zeroug and F. E. Stanke, "Ultrasonic pulsed beam interaction with a fluid-loaded elastic plate: theory," Journal of Acoustical Society of America, vol. 100, No. 3, pp. 1339-1348, 1996.

S. Zeroug and F. E. Stanke, "Ultrasonic pulsed beam interaction with a fluid-loaded elastic plate: experimental validation," Journal of Acoustical Society of America, vol. 100, No. 3, pp. 1349-1356, 1996.

T. M. Habashy and A. Abubakar, "A general framework for constraint minimization for the inversion of electromagnetic measurements," in Progress in Electromagnetics Research, PIER, vol. 46, 2004, pp. 265-312.

C.T. Kelley, "Iterative methods for Optimization," SIAM Frontiers in Applied Mathematics, No. 18, 1999 (188 pages).

* cited by examiner

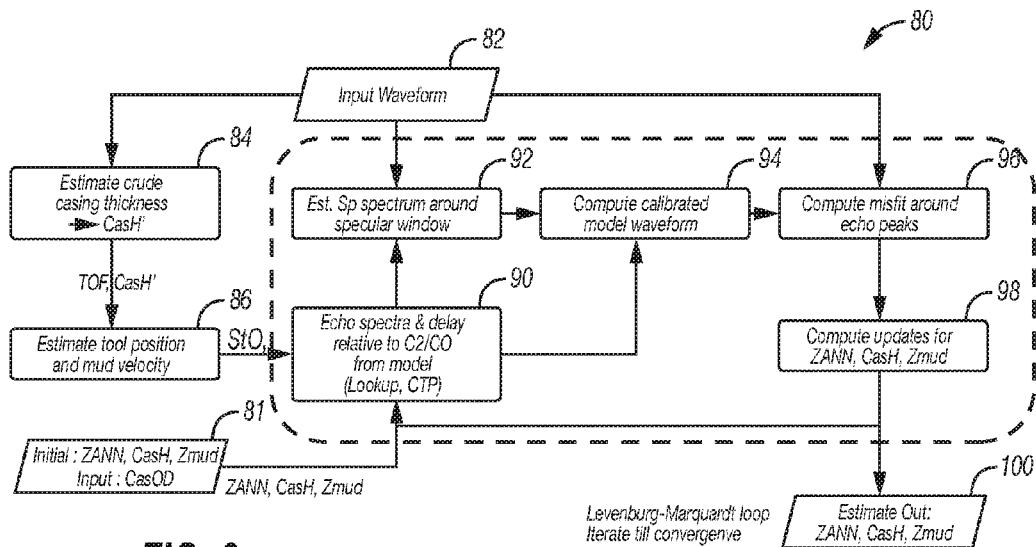
FIG. 6
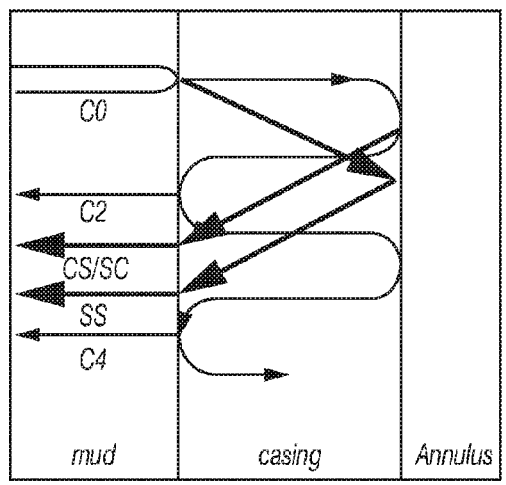
FIG. 7
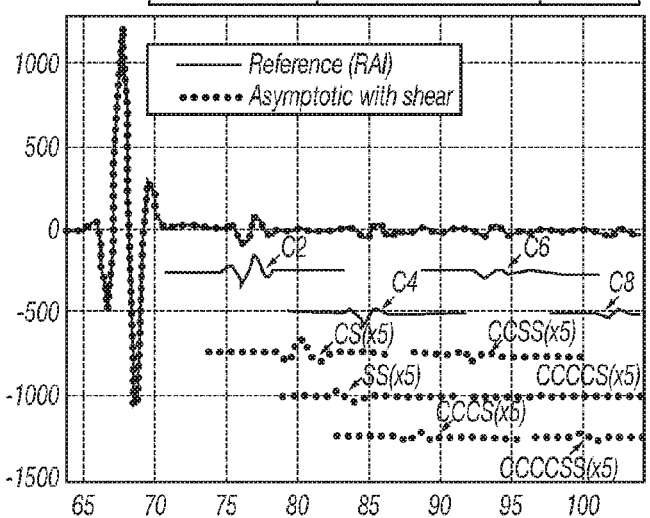

FAST MODEL BASED INVERSION OF ACOUSTIC IMPEDANCE OF ANNULUS BEHIND CASING

RELATED APPLICATIONS

This application claims the benefit of and priority to U.S. Provisional Patent Application No. 62/066,299, entitled "Fast Model Based Inversion of Acoustic Impedance of Annulus behind Casing from Ultrasonic Pulse Echo Measurements on Thick Casings," filed Oct. 20, 2014.

BACKGROUND

The present invention relates to techniques for performing wellbore operations. More particularly, the present invention relates to techniques for determining characteristics of subterranean formations using acoustic wellbore data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

In a well completion, a string of casing or pipe is typically set in a wellbore, and a annulus fill material (e.g., cement) is disposed in the annular space between the casing and the earth formation. One objective of filling the annular space is to separate oil- and gas-producing layers from each other, and from water-bearing formation strata. If the cement fails to provide isolation of one zone from another, fluids under pressure may migrate from one zone to another, reducing production efficiency. Also, migration of hydrocarbons into aquifers is environmentally and economically undesirable. Evaluating the annulus content is important for reliable determination of the zonal isolation of the different strata of a formation.

Acoustic evaluation is often used to determine whether the cement provides hydraulic zonal isolation between formation strata traversed by the drilled well. Certain acoustic measurements, such as the ultrasonic pulse-echo measurement, has been widely used in cement evaluation to provide the effective acoustic impedance of the annulus material adjacent to the casing with high azimuthal and axial resolution and thereby evaluate cement characteristics and zonal isolation. For example, an ultrasonic pulse-echo tool may transmit a broadband pulse, usually between 200 and 700 kHz, to the casing wall to excite a thickness resonance mode in the casing. The acquired signals may be processed using modeling techniques to estimate the annular acoustic impedance. However, some conventional approaches are more suitable for thinner casings (e.g., casings thinner than 12 mm) and have not been as suitable for the larger and thicker casings in acoustically-attenuative heavier borehole muds that are more commonly used today. Such wellbore environments can result in acoustic behavior that reduces the accuracy of cement evaluation.

SUMMARY

A summary of certain embodiments disclosed herein is set forth below. It should be understood that these aspects are presented merely to provide the reader with a brief summary of these certain embodiments and that these embodiments are not intended to limit the scope of the systems and methods described herein. Indeed, embodiments of systems and methods described herein may encompass a variety of aspects that may not be set forth below.

Embodiments described herein relate to systems, methods, and computer-readable media for the evaluation of wellbore annulus properties based on inversion of acoustic measurements. According to some embodiments, a method is provided for determining properties of a wellbore in a formation, the wellbore comprising a casing and an annular fill material between the casing and the formation. The method includes obtaining from an acoustic logging tool, acoustic data comprising acoustic waves reflected from the casing, the annular fill material, the formation, one or more interfaces between any of the casing, the annular fill material, and the formation, or combinations thereof and estimating a crude casing thickness, a tool position, and a velocity of mud between the acoustic logging tool and the casing, or combinations thereof, based on the acoustic data. The method also includes computing a model spectra and an estimated casing thickness using a forward model and based on a crude casing thickness, an initial mud acoustic impedance, and an initial annular acoustic impedance, estimating a specular signal using the model spectra and the acoustic data in a first time window, computing a calibrated model signal using the estimated specular signal and computed model spectra, computing a misfit of the computed calibrated model signal and acoustic data in a second time window comprising the initial time window, and computing a correction update to one or more of the estimated casing thickness an estimated apparent annular acoustic impedance and an estimated mud acoustic impedance, based on the misfit. Techniques involve iteratively estimating the model spectra and the Jacobian curve, computing the specular signal, computing the misfit, and computing the update until the update is below a threshold. Outputs may include one or more of a casing thickness, an apparent acoustic impedance of the annular fill material, and the acoustic impedance of mud.

Additionally, in some embodiments, a method is provided for measuring an acoustic waveform at an acoustic transducer in a wellbore comprising casing and annular material, where the measured acoustic waveform is a reflection from the wellbore. The method also involves computing a crude casing thickness by processing the acoustic waveform, determining an initial mud acoustic impedance of mud between the acoustic transducer and the casing and an initial annular acoustic impedance of the annular material, using the estimated crude casing thickness, the initial mud acoustic impedance, and the initial annular acoustic impedance in a forward modeling to calculate a model spectra, using the model spectra to calculate a specular signal, using the model spectra and the specular signal to calculate a calibrated model signal, using the model spectra and the calibrated model signal to compute a misfit of the calibrated model signal, and using the misfit to compute an update to one or more of the estimated casing thickness, the initial mud acoustic impedance, and the initial annular acoustic impedance. The method may involve outputting one or more of a thickness of the casing, an apparent acoustic impedance of the annular fill material, and the acoustic impedance of mud once the computed update is below a threshold.

Moreover, in some embodiments, a non-transitory computer-readable medium storing computer-executable instructions is provided. When executed by at least one processor, the instructions cause the at least one processor to perform the following: inputting, from an acoustic tool deployed in a wellbore comprising casing and annular fill, a measured waveform comprising one or more reflected acoustic waves; estimating, using the measured waveform, a crude thickness of the casing and a positioning of the acoustic tool; estimating an initial mud impedance of mud between the acoustic tool and the casing and an initial annular fill acoustic impedance; using forward modeling to estimate, based on the crude thickness of the casing and the positioning of the acoustic tool, an estimated casing thickness, an estimated annular fill acoustic impedance, and an estimated mud acoustic impedance; modeling a modeled spectra based on the estimated casing thickness, the estimated annular fill impedance, and the estimated mud impedance; computing a specular signal based on the modeled spectra and estimated casing thickness; computing a misfit of the specular signal using a reconstruction operator on the modeled spectra; computing an update to the estimated casing thickness based on the computed misfit; update the casing thickness and iteratively model the modeled spectra, compute the specular signal, compute the misfit, and compute the update until the update is below a threshold; and output one or more of a calibrated casing thickness, an apparent acoustic impedance of the annular fill material, and the acoustic impedance of mud.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Additionally, depending on the context, singular and plural terminology may be used interchangeably.

FIG. 6 is a schematic representation of the decomposition of an acoustic waveform in thick casings in accordance with one or more example embodiments.

FIG. 7 is a block diagram of a workflow for a model-based inversion technique for thick casings in accordance with one or more example embodiments.

DETAILED DESCRIPTION

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
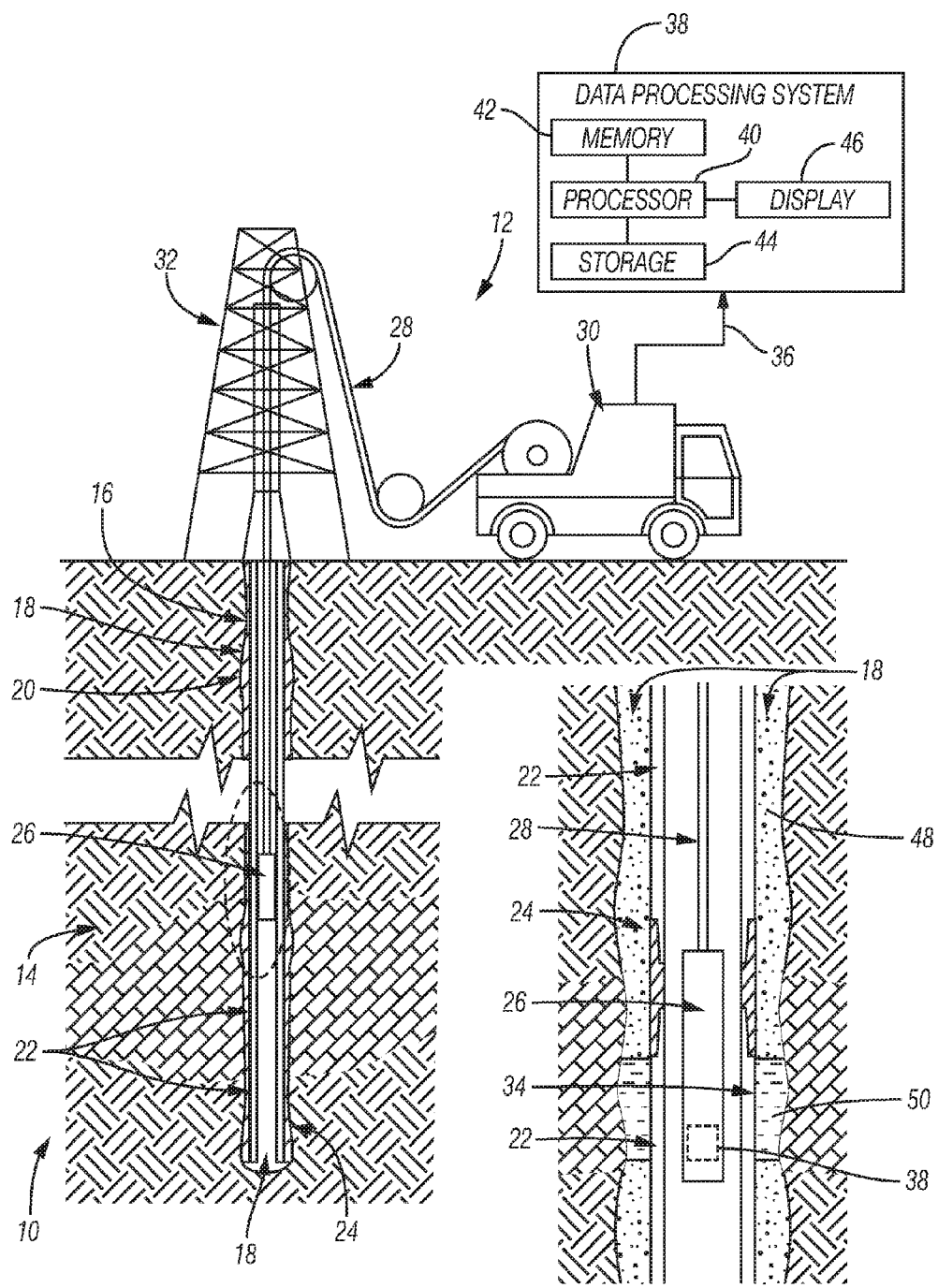
FIG. 1 is a schematic diagram of an example system for evaluating cement installation and zonal isolation of a well in accordance with one or more example embodiments.

FIG. 1 schematically illustrates an example system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 has been used to seal an annulus 20—the space between the wellbore 16 and casing joints 22 and collars 24—with cementing operations. In some embodiments, the annular fill 18 may include cement, resin, or any other material suitable for filling the annulus 20.

As seen in FIG. 1, several casing joints 22 (also referred to below as casing 22) represent lengths of pipe that are coupled together by the casing collars 24 to form a casing string which stabilizes the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation and well integrity data (e.g., casing thickness, apparent acoustic impedance, drilling fluid impedance, etc.) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. In some embodiments, drilling fluid or mud 25 may be present around the acoustic logging tool 26 as it is conveyed in the wellbore 16.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic data 36 (e.g., acoustic waveforms) used to evaluate the integrity of the cased wellbore 16. When the acoustic logging tool 26 provides such measurements to the surface equipment 12 (e.g., through the cable 28), the surface equipment 12 may pass the measurements as acoustic data 36 to a data processing system 38 (e.g., a cement evaluation system) that includes a processor 40, memory 42, storage 44, and/or a display 46. In other examples, the acoustic data 36 may be processed by a similar data processing system 38 at any other suitable location. For example, in some embodiments, all or a portion of data processing may be performed by a data processing system 38 in the acoustic logging tool 26 or near the acoustic logging tool 26 downhole.

The data processing system 38 may collect the acoustic data 36 which may be evaluated to estimate properties associated with the integrity of the wellbore 16, such as a thickness of the casing 22, an apparent acoustic impedance of the annular fill 18, and/or an apparent acoustic impedance of the drilling fluid 25. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, etc. The display 46 may be any suitable electronic display that can display the logs and/or other information relating to classifying the material in the annulus 20 behind the casing 22. The processor 40 is not limited to any particular device type or system. The processor 40 may be a computer, such as a laptop computer, a desktop computer, or a mainframe computer. The processing system may include a graphical user interface (GUI) so that a user can interact with the processor 40. The processor 40 may also include a processor (e.g., a microprocessor, microcontroller, digital signal processor, or general purpose computer) for executing any of the methods and processes described herein.

In some embodiments, the acoustic data 36 from the acoustic logging tool 26 may be used to determine the presence of solid cement in the annular fill 18 has been installed as expected. In some cases, the acoustic data 36 may be evaluated to determine whether the cement of the annular fill 18 has a generally solid character (e.g., as indicated at numeral 48) and therefore has properly set. In other cases, the acoustic data 36 may indicate the potential absence of cement or that the annular fill 18 has a generally liquid or gas character (e.g., as indicated at numeral 50), which may imply that the cement of the annular fill 18 has not properly set.

The acoustic logging tool 26 may be, for example, an UltraSonic Imager (USI™) tool and/or an Isolation Scanner™ tool by Schlumberger. The acoustic logging tool 26 may obtain acoustic data 36 to evaluate properties of the cased wellbore 16 in accordance with embodiments of the present techniques. For instance, the acoustic logging tool 26 may obtain a pulse echo measurement that exploits the thickness mode (e.g., in the manner of an ultrasonic imaging tool) or may perform a pitch-catch measurement that exploits the casing flexural mode. The ultrasonic pitch-catch technique may be based on exciting and detecting from the casing quasi-Lamb modes with emphasis on the lowest-order anti-symmetric mode (A0) often referred as the flexural mode. The casing flexural mode also radiates elastic energy into the annulus between casing and formation (or between a primary casing and a secondary one as it occurs for multiple string situations). When the annulus is filled with cement, either a shear wave only or both shear and compressional waves may be radiated into the cement layer, depending on the mechanical properties of the cement or annulus material.

Figure 2:
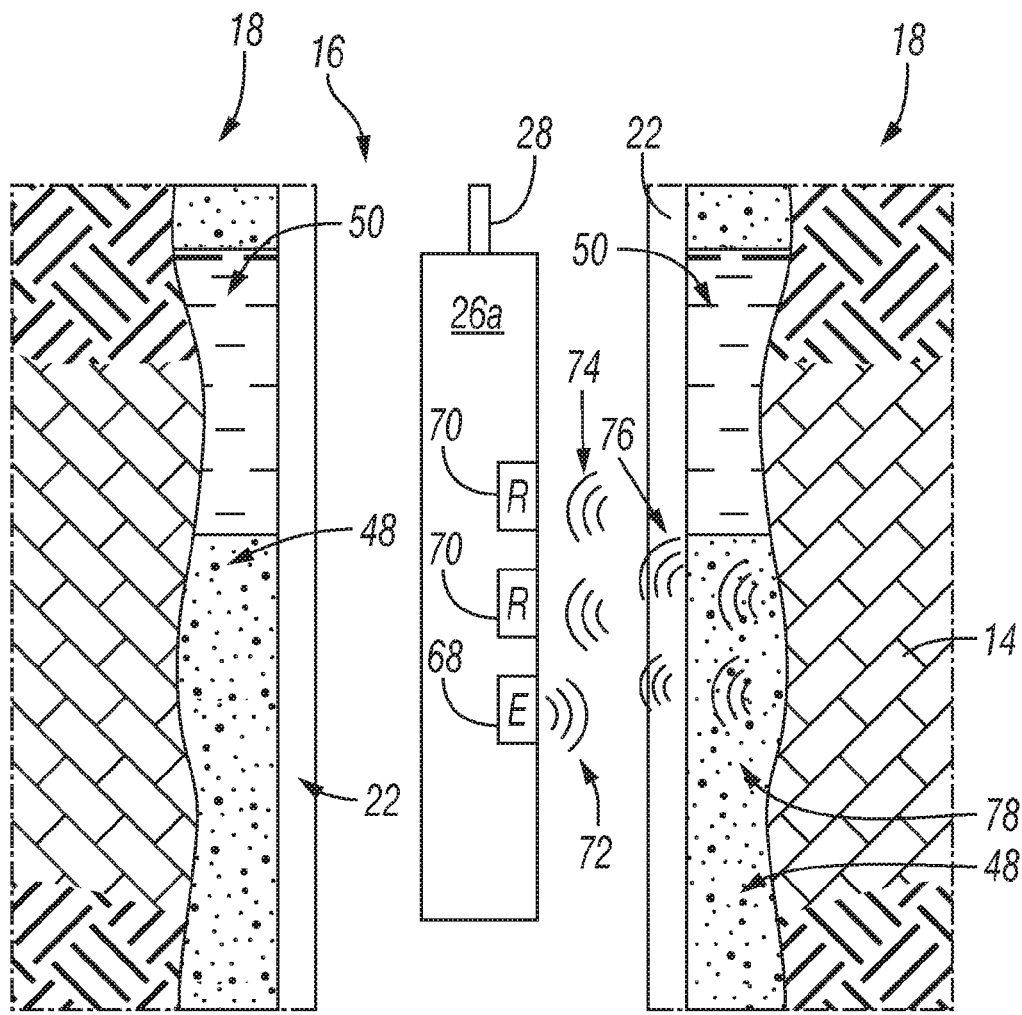
FIG. 2 is a schematic representation of an example acoustic downhole tool to obtain pitch-catch acoustic cement evaluation data in accordance with one or more example embodiments.

FIG. 2 provides an example embodiment of the acoustic logging tool 26a having an emitter 68 and a pair of receiver transducers 70. The emitter 68 in the acoustic logging tool 26a may emit acoustic energy 72 out toward the casing 22 resulting in reflected waves 74, 76, and 78. In the embodiments shown in FIG. 2, the emitted energy excites a predominantly zeroth-order asymmetric mode (also referred to as flexural mode). As in the embodiment described above, the acoustic waves 72 propagate via transmission into both sides of the casing wall 22. The transmission in the casing annulus depends on the material on the outer side of the casing wall with a different amount of energy leak inside the annulus. The acoustic logging tool embodiment depicted in FIG. 2 may use measurements of acoustic impedance from flexural attenuation. The different distance from the emitter 68 and the two receiver transducers 70 and the energy leak induce different amplitudes on the measured acoustic pressure.

Figure 3:
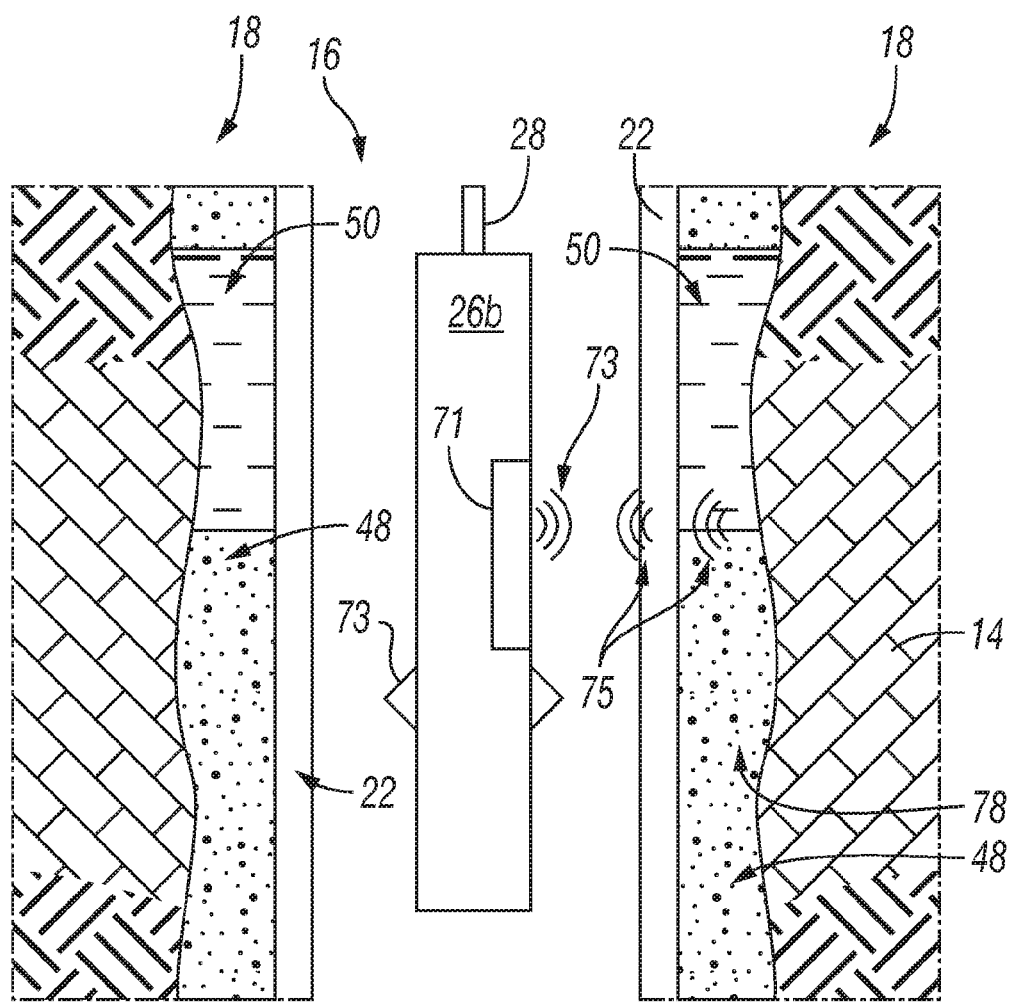
FIG. 3 is a schematic representation of an example acoustic downhole tool to obtain pulse-echo acoustic cement evaluation data in accordance with one or more example embodiments.

FIG. 3 is another example embodiment of the acoustic logging tool 26b suitable for the pulse-echo measurement. The acoustic logging tool 26b may have a transducer 71 and one or more centralizers 73 so that the tool 26b may be centralized as it rotates to insonify the casing 22 with the transducer 71. The transducer 71 may transmit acoustic energy 73 normally to the surface of the casing 22 so as to excite a thickness resonance in the casing 22. The acoustic energy that is reflected back, represented as the reflected waves 75, may be collected at the same transducer 71 and processed to evaluate characteristics of the integrity of the wellbore 16, such as the condition of the annular fill 18 behind the casing 22. The annular fill 18 affects the temporal decay of the thickness resonance of the reflected energy. For example, fluid in the annulus 20 results in a thickness resonance having prolonged ringing while annular fill 18 that is bonded generally dampens the thickness resonance. In accordance with embodiments of the present techniques, effects of the annulus on the reflected energy may be quantified in terms of an apparent acoustic impedance of the annular fill 18. Generally, impedance is the product of density and compressional wave velocity, and a measurement or estimate of the acoustic impedance may be used for evaluation of the integrity of the wellbore 16 and/or the characteristics of the annular fill 18 behind the casing 22.

One or more aspects or embodiments of the present techniques may be applicable to flexural mode, pitch-catch measurements such as those obtained by the tool 26a in FIG. 2 and thickness mode, pulse-echo measurements such as those obtained by the tool 26b in FIG. 3. Accordingly, the acoustic data 36 used in the model-based inversions of the present techniques may be from tool 26a, tool 26b, or from any other suitable acoustic logging tool, generalized as tool 26. Furthermore, acoustic data 36 may include acoustic waveforms or reflected waves from the casing 22, the annular fill 18, the formation 14, and/or any of the interfaces between mud and the casing 22, annular fill 18, formation 14. The acoustic data 36 may also be referred to as the input waveforms or measured waveforms.

Some acoustic processing techniques estimate the acoustic impedance of the annulus by using a one dimensional transmission line model where the thickness resonance is dependent on reflection coefficients at the inner and outer walls of the casing. The reflection coefficients may be defined in terms of the acoustic impedance of the media at each of these interfaces (e.g., interface between the drilling fluid and casing material, interface between casing and the annular material, etc.). A normalized group delay may be computed from the reflected waves and estimates of the annular impedance may be obtained by matching the observed group delay to the normalized group delay predicted by the one-dimensional model using the estimated annular impedance. The impedance of the casing and mud may be assumed. This one-dimensional model may suitably approximate cases where the energy remains mostly compressional and propagates normally to the casing wall which is assumed to be planar at the region where the transducer beam insonifies it, and where shear mode conversion is insignificant. The raw estimates may be corrected with a look up table generated offline with a full three-dimensional model which accounts for the effects neglected in the one dimensional transmission line model.

However, in certain cases, such as when casings are relatively thicker (e.g., thicker than ~12 mm) or when the tool becomes eccentered, three-dimensional propagation effects and shear mode conversion are no longer insignificant and may impact the accuracy and robustness of the results from conventional acoustic inversion processing techniques. Moreover, the conventional processing technique of using a known or assumed mud impedance may also contribute to inaccuracies, as many weighted muds and specially formulated muds may not have known mud impedances. The use of assumptions in mud impedance may thereby also impact the accuracy of estimating the acoustic impedance of the annulus.

In one or more embodiments of the present techniques, a model-based inversion method may use a three-dimensional model in an inversion for casing thickness, annular impedance, and mud impedance.

Pulse-Echo Measurement Modeling

Figure 4:
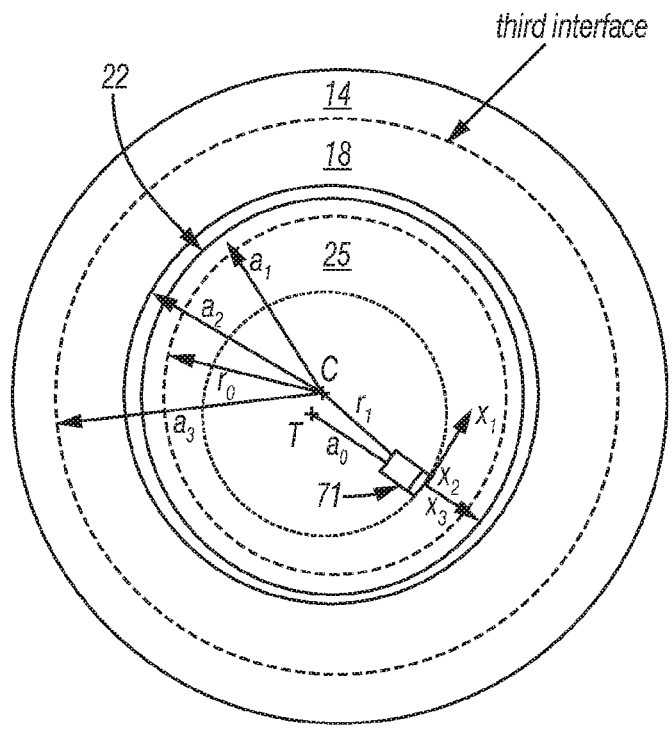
FIG. 4 is a cross-sectional representation of an acoustic logging tool in a cased wellbore and geometric representation of a pulse-echo acquisition in accordance with one or more example embodiments.

A geometric representation of a pulse-echo acquisition is shown in FIG. 4, which is a cross-sectional representation of an acoustic logging tool 26 in a cased wellbore 16. In FIG. 4, a transducer 71 disposed in the acoustic logging tool 26 insonifies a cylindrically layered wellbore 16 having casing 22, annular fill 18 around the casing 22, and formation 14 around the annular fill 18. The acoustic tool 26 may be deployed within the casing 22 area, where there may be drilling fluid (i.e., mud) 25. When energized, the transducer 71 excites pressure waves that propagate within the borehole and interact with the casing 22. In reception mode, the transducer 71 receives the acoustic energy reflected and/or scattered back from the casing 22 and this energy is converted into a transient electric voltage. The borehole fluid, casing and cement annulus may be assumed to be isotropic and homogeneous in the volume probed by the transducer such that a linear elastic theory is applicable.

The time-domain voltage $e_T(t)$ (i.e., the voltage representative of the reflected acoustic energy) generated by the transducer 71 in reception mode can be derived from its frequency-domain counterpart $E_T(\omega)$ via the Fourier transform below:

$$e_T(t) = \frac{1}{2\pi} \int E_T(\omega) e^{-i\omega t} d\omega, \quad (1)$$

where $\omega$ is the angular frequency. In the numerical implementation, Equation (1) is carried out via a fast Fourier transform (FFT) algorithm.

Pulse-echo measurements may be affected by different transducer configurations, and pulse-echo modeling may also be adapted accordingly. Pulse-echo modeling for a general transducer may involve computing the transducer voltage by deriving the spectral wavenumber integral from the conventional surface integral. The frequency-domain counterpart $E_T(\omega)$ of the time-domain voltage may be computed in terms of spectral integrals over the spatial wavenumber $(v, \beta)$ decomposition where $v$ and $\beta$ respectively represent the azimuthal and axial continuous wavenumbers that correspond to infinite-azimuthal ($\varphi$) and infinite-axial (z) coordinates. More specifically, it can be written in terms of the spectrum of the pressure radiated at some intermediary radius $r_0$, $$E_T^{(p)}(\omega) = \qquad (2)$$

$$\frac{\gamma(\omega)}{\pi^3 \omega \rho_f} \int\int_{-\infty}^{\infty} \hat{p}^T(r_0; v, \beta) \hat{p}^T(r_0; -v, -\beta) \Gamma_{glob}(v, \beta) \frac{H_v^{(1)}(\kappa_f a_1)}{H_v^{(2)}(\kappa_f a_1)} \times$$

$$[H_v^{(1)}(\kappa_f r_0)]^{-2} dv d\beta,$$

with $\kappa_f = \sqrt{k_f^2 - \beta^2}$, $\text{Re}\{\kappa_f\}$, $\text{Im}\{\kappa_f\} > 0$, and $k_f = \omega/v_f$, $v_f$ represents the sound speed in the mud and $\rho_f$ is the mud density. The quantity $\hat{p}^T(r_0; v, \beta)$ is the spectral amplitude of the pressure wave at $r = r_0$ (see FIG. 4) radiated by T within the $(v, \beta)$ decomposition, and $H_v^{(1,2)}$ are outgoing (1) and incoming (2) Hankel functions of real order $v$; $\Gamma_{glob}(v, \beta)$ is a spectral reflection coefficient accounting for the interaction of the $(v, \beta)$ wave component with the cylindrically layered medium with reference to the innermost interface at $a_1$. The frequency-dependent quantity $\gamma(\omega)$ depends upon the electrical internal and load impedances of T in its receiving state and is introduced to account for the temporal spectrum of the transmitter and receiver electronics. It may be derived from a suitable calibration experiment.

The pressure spatial spectrum $\hat{p}^T(r_0; v, \beta)$ may be computed using a direct approach via a spectral Rayleigh-Sommerfeld formula. This uses a projected radial velocity distribution at a cylindrical surface of radius $r_T$ in front of the transducer face (see FIG. 4) to compute a corresponding velocity spatial spectrum $\hat{v}_r^T(r_T; \nu, \beta)$. In the parametric high-frequency regime of interest, where $k_f a_1 \gg 1$, the Hankel functions in equation 2 can be approximated by their high-frequency Debye asymptotic forms which yield expressions that are convenient for efficient numerical implementation. Therefore, based on the direct approach and Debye-approximation, the transducer voltage can be written as:

$$E_T^{(v)}(\omega) \sim \frac{\gamma(\omega)\omega\rho_f r_T}{2\pi^2} \iint \int_{-\infty}^{\infty} \frac{1}{\kappa_f \sin\gamma_T} \hat{v}_r^T(r_T; \nu, \beta)\hat{v}_r^T(r_T; -\nu, -\beta)\Gamma_{glob}(\nu, \beta) \exp\{iP_T(\nu, \beta)\} d\nu d\beta, \quad (3)$$

where $$P_T(\nu,\beta)=2[\kappa_f(a_1 \sin\gamma_1 - r_T \sin\gamma_T) - \nu(\gamma_1 - \gamma_T)], \quad (4)$$

and $$\gamma_T = \cos^{-1}\frac{\nu}{\kappa_f r_T}. \quad (5)$$

Circular transducers with axisymmetric aperture profiles may be modeled by a complex-transducer-points (CTP) technique, based on the complex-source-point (CSP) technique, which circumvents the computationally intensive integrations over the transducer apertures and may also be used for configurations where the aperture geometries do not conform to the geometry of the structures insonified. By the CSP method, an isotropic spherical wave may be converted into a quasi-Gaussian beam (in real space) when the coordinates of the source point are displaced into complex space. Thus, a CSP accurately models a finite, quasi-Gaussian source. By reciprocity, evaluation of an acoustic field at a complex point in space models reception with a finite, quasi-Gaussian beam receiver. The complex-transducer-point (CTP) method uses both complex receiver points (CRPs) and CSPs to model ultrasonic measurements with flat and focused transducers which have quasi-Gaussian profiles. Transducers with more general profiles are treated as collections of (typically, a small number of) CTPs. Boundary-value (i.e. interaction) problems involving wave transmission, scattering, reception, etc., solvable for real source fields observed at real points using already available techniques may then be applied to flat and focused beam-type sources and receivers by analytic continuation via the CTP method.

The transducer voltage received by a circular transducer can be written as $$E_{CTP}^{cyl}(\omega) \sim \frac{\gamma(\omega)\omega\rho_f}{8\pi^2} \iint \int_{-\infty}^{\infty} \frac{1}{\kappa_f \tilde{r}_T \sin\tilde{\gamma}_T} \Gamma_{glob}(\nu, \beta) \exp\{iP_{cyl}(\nu, \beta)\} d\nu d\beta, \quad (6)$$

where $$P_{cyl}(\nu, \beta) = 2[\kappa_f(a_1 \sin\gamma_1 - \tilde{r}_T \sin\tilde{\gamma}_T) - \nu(\gamma_1 - \tilde{\gamma}_T)], \quad (7)$$

and $$\tilde{\gamma}_T = \cos^{-1}\frac{\nu}{\kappa_f \tilde{r}_T}. \quad (8)$$

where the tilde sign ~ refers to the complex coordinates of the CTPs. Specifically, $\tilde{r}_T = r_T + ib_T \cos\theta$. The real positive parameter $b_T$ is the CTP beam Fresnel length; $b_T$ is related to the $1/e$ width of the CTP transducer, $W_T$, through $W_T = \sqrt{2b_T/k_f}$. The angle $\theta$ is the transducer pointing direction with respect to the casing wall normal direction.

Figure 5:
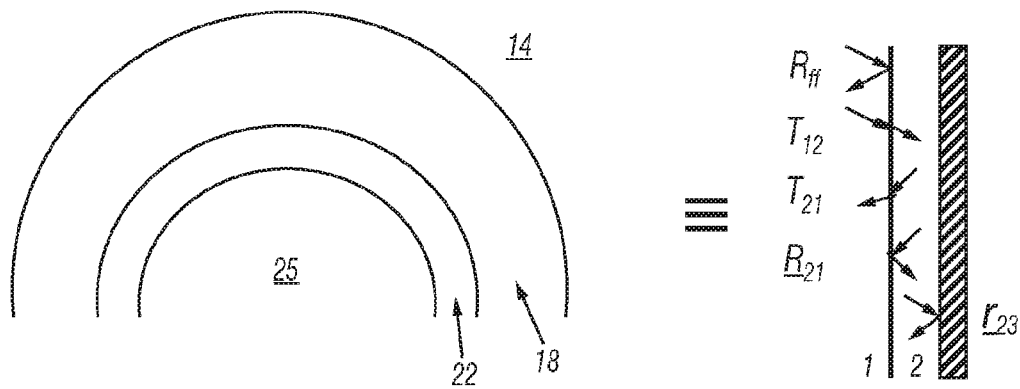
FIG. 5 is a schematic representation of layers and interfaces in a cased wellbore in accordance with one or more example embodiments.

For the high frequency cases, the cylindrical wave reflection coefficient can be approximated by the corresponding local plane wave reflection coefficient, as represented in the schematic of FIG. 5. The relation between the cylindrical wavenumber $(\nu, \beta)$ and the 'planar' wavenumber k is represented as:

$$k = \sqrt{\nu^2/a_i^2 + \beta^2}, \quad (9)$$

where $a_i$ is the radius of the interface at which the wave reflection is considered; the first, second, and third interfaces represent the mud-casing interface 1, casing-annulus interface 2, and annulus-formation interface 3 respectively. The 2×1 vectors are denoted by boldfaced quantities (e.g., T) and 2×2 matrices by underlined boldfaced quantities (e.g., $\underline{R}$). The $\underline{\Gamma}$ represents global reflection coefficients accounting for at least one layer, whereas R represents a single-interface reflection coefficient which could in fact be a matrix since elastic media support two types of waves: compressional and shear. In some embodiments, except for the borehole fluid, the other layers are all elastic in nature.

Referring to FIG. 4, $\Gamma(k = \sqrt{\nu^2/a_i^2 - \beta^2})$ can be expressed in terms of coefficients of the first layer and a global reflection coefficient $\Gamma_{23}(k)$ which accounts for the effect of the annulus and formation, as in the equation below:

$$\Gamma_{glob} = R_{ff} + (T_{21})^t \underline{E}_2 \underline{\Gamma}_{23} \underline{E}_2 (\underline{I} - \underline{F}_2)^{-1} T_{12}, \quad (10)$$

where $\underline{I}$ is the identity matrix, $\underline{E}_2$ is the propagator matrix in layer 2 and defined below, $\underline{T}_{12}$ and $\underline{T}_{21}$ are transmission vectors accounting for transmission at the first interface of traveling P and S waves (the first numerical in the subscript on these quantities indicates the incidence layer); and the superscript denotes the transpose operation. $\underline{F}_2$ is the reverberation matrix accounting for round trip propagation of compressional (P) and shear (S) waves within the casing, with coupling between them at the layer interfaces, as represented in the equation below:

$$\underline{F}_2 = \underline{R}_{21} \underline{E}_2 \underline{\Gamma}_{23} \underline{E}_2, \quad (11)$$

where $\underline{R}_{21}$ is a reflection matrix accounting for reflection and coupling of P and S plane waves at the interface between the borehole fluid and casing with incidence from the casing (hence the subscript $_{21}$); $R_{ff}$ accounts for pressure (P) plane wave reflection at the first interface (assuming the casing to be infinite in extent). In the cases where the formation is ignored, $\underline{\Gamma}_{23}$ is equal to $\underline{R}_{23}$, which is similar to $\underline{R}_{21}$ but at the second interface.

The propagation matrix $\underline{E}_2$ is defined as follows, $$\underline{E}_2 = \begin{pmatrix} e^{i\kappa_{p_2} h_1} & 0 \\ 0 & e^{i\kappa_{s_2} h_1} \end{pmatrix} \quad (12)$$

with $h_1 = a_2 - a_1$, the casing thickness, and $$k_{p_i,s_i} = \sqrt{k_{p_i,s_i}^2 - k^2} = \sqrt{k_{p_i,s_i}^2 - (\nu^2/a_i^2 + \beta^2)}; \; k_{p_i,s_i} = \omega/v_{p_i,s_i}, \quad (13)$$

where $v_{p_i,s_i}$ are the compressional and shear velocities of the $i^{th}$ layer. For the outermost layer extending to infinity, $\kappa_{p_i,s_i}$ are accompanied by the conditions, $$\text{Im}\{\kappa_{p_i,s_i}\} \geq 0, \quad (14)$$

to ensure decay of the fields at r→∞. The reflection and transmission vectors and matrices used in equations (10) and (11) are defined according to equations (15) and (16) below:

$$\underline{R}_{21} = \begin{pmatrix} \overleftarrow{R}_{p_2,p_2} & \overleftarrow{R}_{s_2,p_2} \\ \overleftarrow{R}_{p_2,s_2} & \overleftarrow{R}_{s_2,s_2} \end{pmatrix}, \quad (15)$$

$$\underline{R}_{23} = \begin{pmatrix} \overrightarrow{R}_{p_2,p_2} & \overrightarrow{R}_{s_2,p_2} \\ \overrightarrow{R}_{p_2,s_2} & \overrightarrow{R}_{s_2,s_2} \end{pmatrix},$$

$$T_{21} = \begin{pmatrix} \overleftarrow{T}_{p_2,f} \\ \overleftarrow{T}_{s_2,f} \end{pmatrix}, T_{12} = \begin{pmatrix} \overrightarrow{T}_{f,p_2} \\ \overrightarrow{T}_{f,s_2} \end{pmatrix}, \quad (16)$$

To distinguish between the elements of $\underline{R}_{21}$ and $\underline{R}_{23}$ as they pertain to the two interfaces of the casing, the upper arrow indicates the inward direction (←) from the casing to the borehole fluid, and the outward direction (→) from casing to the annular fill. The matrix elements in equations (15) and (16) represent single-interface plane-wave reflection, coupling, and transmission coefficients. The above plane-wave reflection and transmission coefficients may be evaluated at $k=\sqrt{v^2/a_i^2-\beta^2}$ where $a_i$ is the radius of the interface corresponding to its respective coefficient.

Expansion in Terms of Multiple Reflected Beams—Propagatory Regime in Thick Casings The term $(I-F_2)^{-1}$ in the global reflection coefficient in Equation (10) is based on an infinite series expansion:

$$(\underline{I} - \underline{F}_2)^{-1} = \sum_{l=0}^{\infty} (\underline{F}_2)^l. \quad (17)$$

Accordingly, equation (10) may also be represented as $$\Gamma_{glob} = R_{ff} + \sum_{l=0}^{\infty} (T_{21})^t \underline{E}_2 \underline{\Gamma}_{23} \underline{E}_2 (F_2)^l T_{12}. \quad (18)$$

Each element in the series represents the reflection coefficient of a certain beam of wave which propagates within the medium with a combination of compressional (C) and shear (S) segments as shown in the plot and wave reflection representation of FIG. 6 For example, the reflection coefficient $\Gamma_{CS}$ for the beam CS consisting of one C and one S ray segment may follow the relationship below $$\Gamma_{CS} = \overrightarrow{T}_{s_2,f} e^{i s s_2 h_1} \overrightarrow{R}_{p_2 e_2} e^{i s s_2 h_1} \overrightarrow{T}_{f,p_2}. \quad (19)$$

Therefore, instead of evaluating the global reflection coefficient of equation (10), a finite number of beams may be evaluated and summed to obtain the desired waveform within a given time window as shown in FIG. 6. This type of expansion in terms of individual propagating rays or beams may be particularly useful for the case of thick casings with wide band signal energy where the reflections get resolved into individual echoes. These are seen to be efficiently represented by a relative small number of multiply reflected beams inside the time window of interest.

This scenario of thick casing with wide-band signal may be referred to as the propagatory regime wherein it is feasible to focus on matching attributes of the echoes such as the amplitude and phase around the echo peaks rather than the whole waveform. This makes for a lighter cost function that can be handled by a simpler optimization routine. In some embodiments, an interpolation scheme may be implemented with respect to the parameters of interest as the individual beam responses are well behaved over that domain. Accordingly, the model may be accurate even without performing three-dimensional forward model calculations during the inversion.

In the case of axisymmetric transducers, the CTP model may use uniform asymptotics to replace the spectral integrals by closed form analytic expressions, considerably reducing the computational cost of generating forward models without the need for interpolation. Such expressions may be relatively accurate at higher frequencies and may be fit after a bandpass filter. Moreover, a derivative calculation may be used for each mode conversion, such that the accuracy better for beams having fewer mode conversions.

In some cases, the tool may be eccentered, as represented in FIG. 4 which shows the tool eccentering on the right. The eccentering vector is defined for the tool center T with respect to the casing center of curvature C and has magnitude e1. The azimuthal position of the transducer on the tool periphery with respect to the eccentering direction is denoted by φ; θ denotes the angle of incidence, and $r_T$ denotes the transducer radius with respect to C. The tool standoff with respect to the casing is then simply given by $r=a_1-r_T$. The following equations may be derived from the geometry:

$$\theta = \arctan \frac{e_1 \sin\phi}{a_0 + e_1 \cos\phi}, \quad (17)$$

$$r_T = \sqrt{a_0^2 + e_1^2 + 2 a_0 e_1 \cos\phi}.$$

Model-Based Waveform Inversion Workflow
Estimating Crude Casing Thickness

In accordance with the present techniques, embodiments involve a model-based waveform inversion method which uses a three-dimensional forward model to determine an apparent acoustic impedance of the annular fill 18, a thickness of the casing 22, and/or an apparent impedance of the mud 25. FIG. 7 is a block diagram of a workflow 80 representing one or more embodiments of the present techniques. The workflow 80 involves inputting (block 82) acoustic data 36 (e.g., acoustic waveforms, reflected waves, etc. received at a transducer 70, 71). The workflow 80 may involve using acoustic data 36 to estimate (block 84) a crude casing thickness. While a nominal casing thickness may be available, the thickness of a casing may vary significantly along its length, and an empirical estimate of a crude casing thickness may be more accurate than a nominal or assumed thickness.

The casing thickness is related to the resonant frequency of the reflected waves. This relationship is determined by the propagator matrix equations (10), (11), and (12) above via the spectral integrals over the spatial wavenumber (v,β). In some embodiments, for near-normal incidence of acoustic energy, the spectral integral may be mostly small tangential wavenumbers, such that the resonant frequency may be approximated in terms of a one-dimensional model of time of flight in the casing, $$f_{res} \sim \frac{v_{p,cas}}{2 \, casH}$$

where casH is the casing thickness and $v_{p,cas}$ is the casing compressional wave velocity. In such near-normal incidence, the resonant frequency may manifest in the signal spectrum as a notch due to the second interface echoes being 180 degrees out of phase with the main specular from the first interface. The group delay spectrum near the vicinity of the nominal thickness may be searched for this notch in magnitude to identify the resonance frequency. In some embodiments, higher order harmonics also display the notch in the received signal spectrum and may also be used to estimate the resonance frequency.

The crude casing thickness may then be estimated (block 84) by treating $$f_{res} \sim \frac{v_{p,cas}}{2\,casH}$$

as an equality and computing for casH. In some embodiments, the estimated resonance frequency may be empirically corrected to further improve the accuracy of the estimated resonance frequency, and accordingly, the estimated crude casing thickness.

In the propagatory regime, in some embodiments, the resonance frequency may be calculated such that an initial thickness may be estimated by extracting the echo peak locations and fitting a line to these locations. In one or more embodiments, different techniques can be used in practice when the echo peaks are well defined and distinct.

Tool Positioning and Mud Velocity

The workflow 80 may further involve estimating (block 86) the tool position in the wellbore 16, including estimating tool eccentering. Data acquisition is typically performed with a centralized tool, and conventional techniques assume that eccentering is negligible and do not consider eccentering in conventional modeling techniques. However, acoustic logging tools sometimes do become eccentered, especially in deviated wells. Eccentering may significantly affect the acquired data, and ignoring its effects may reduce the accuracy of modeled outputs.

The present techniques involve one or more embodiments for estimating (block 86) the tool position. One embodiment involves using a strong casing specular pulse (i.e., the initial reflected wave from the inner wall of the casing 22) to determine the time of flight estimation by examining the envelope and determining the onset time. The time of flight may then be used to determine tool eccentering as well as the acoustic velocity in the mud. The casing outer diameter may be known and assumed to be circular, and using the initial casing estimate, the inner radius of the casing may be computed. By combining these estimates with the known tool radius and using the time of flight data for a complete azimuthal scan, the tool eccentering and mud acoustic velocity may be computed by fitting the geometry, assuming the tool center has not moved during the scan.

Extended Kalman Filtering

Another embodiment for estimating (block 86) the tool position and/or mud velocity uses a Kalman filter to track the tool motion and estimate tool positioning. A more detailed representation of estimating (block 86) tool position and mud velocity using a Kalman filter is proided in FIG. 8, which is a schematic of a workflow 86a inputting a reflected waveform (e.g., acoustic data 36) to compute (block 110) a time of flight. The workflow 86a may be used to estimate an eccentering state vector $e_k = [e_{x,k}\ e_{y,k}\ \dot{e}_{x,k}\ \dot{e}_{y,k}\ s_{mud,k}]^T$ where each frame step k corresponds to an acquisition at a particular depth and azimuth. The variables $e_{x,k}\ e_{y,k}$ are tool eccentering coordinates and the variables $\dot{e}_{x,k}\ \dot{e}_{y,k}$ represent the corresponding rate of change of the tool position, and the variable $s_{mud,k}$ represents the mud acoustic slowness. The update matrix A below may update the eccentering state taking into account their change rate.

$$A = \begin{bmatrix} 1 & 0 & 1 & 0 & 0 \\ 0 & 1 & 0 & 1 & 0 \\ 0 & 0 & 1 & 0 & 0 \\ 0 & 0 & 0 & 1 & 0 \\ 0 & 0 & 0 & 0 & 1 \end{bmatrix}. \quad (18)$$

The update process for the state sequence $e_k$ can be written as $$e_k = A\,e_{k-1} + w_k \quad (19)$$

where $w_k$ is the process noise.

The Kalman state at step k can be related to the time of flight observations by computing the tool standoff $r_k$ in the equation below $$r_k = a_{1,k} - \sqrt{a_0^2 + e_{x,k}^2 + e_{y,k}^2 + 2a_0 e_{x,k}\cos(\varphi_{a,k}) + 2a_0 e_{y,k}\sin(\varphi_{n,k})}, \quad (20)$$

and then multiplying by $s_{mud}$; $t_{k,spec,est} = 2r_k s_{mud,k}$. Since this relation is non-linear, the extended Kalman filter may be used to compute derivatives of the predicted observations with respect to the state variables. In one embodiment, the equation $$r_k = (a_{1,k} - a_0) - e_{x,k}\cos(\varphi_{a,k}) - e_{y,k}\sin(\varphi_{a,k}), \quad (21)$$

may be used for estimating the standoff and computing the derivatives. The extended Kalman filter as detailed below may then be implemented to estimate the tool positioning (e.g., coordinates $e_{x,k}\ e_{y,k}$) and mud velocity (e.g., via mud slowness $s_{mud,k}$).

---

Algorithm 1 Extended Kalman Filter

Require: $t_{spec,obs}$: set of N peak travel times, $S_p$: process noise covariance matrix, $S_n$: observation noise covariance
1: Initialize $\Sigma_0$, $e_0$
2: for k = 1 to N do
3: $\quad e_{k,pred} = A\,e_{k-1}$
4: $\quad \Sigma_{k,pred} = A\,\Sigma_{k-1}\,A^T + S_p$
5:
$$\Sigma_k = \Sigma_{k,pred} + \left.\frac{dc_k(x)}{dx}\right|_{e_{k,pred}} \left.\frac{dc_k(x)}{dx}\right|_{e_{k,pred}}^T \frac{1}{S_n}$$

6:
$$\sigma_{innov} = \left.\frac{dc_k(x)}{dx}\right|_{e_{k,pred}}^T \sum_{k,pred} \left.\frac{dc_k(x)}{dx}\right|_{e_{k,pred}} + S_n$$

7:
$$G = \sum_{k,pred} \left.\frac{dc_k(x)}{dx}\right|_{e_{k,pred}} \frac{1}{\sigma_{innov}}$$

8: $\quad e_k = e_{k,pred} + G(t_{k,spec,obs} - c_k(e_{k,pred}))$
$\quad$ return $(e_k)_{k=1}^N$

---

Figure 9:
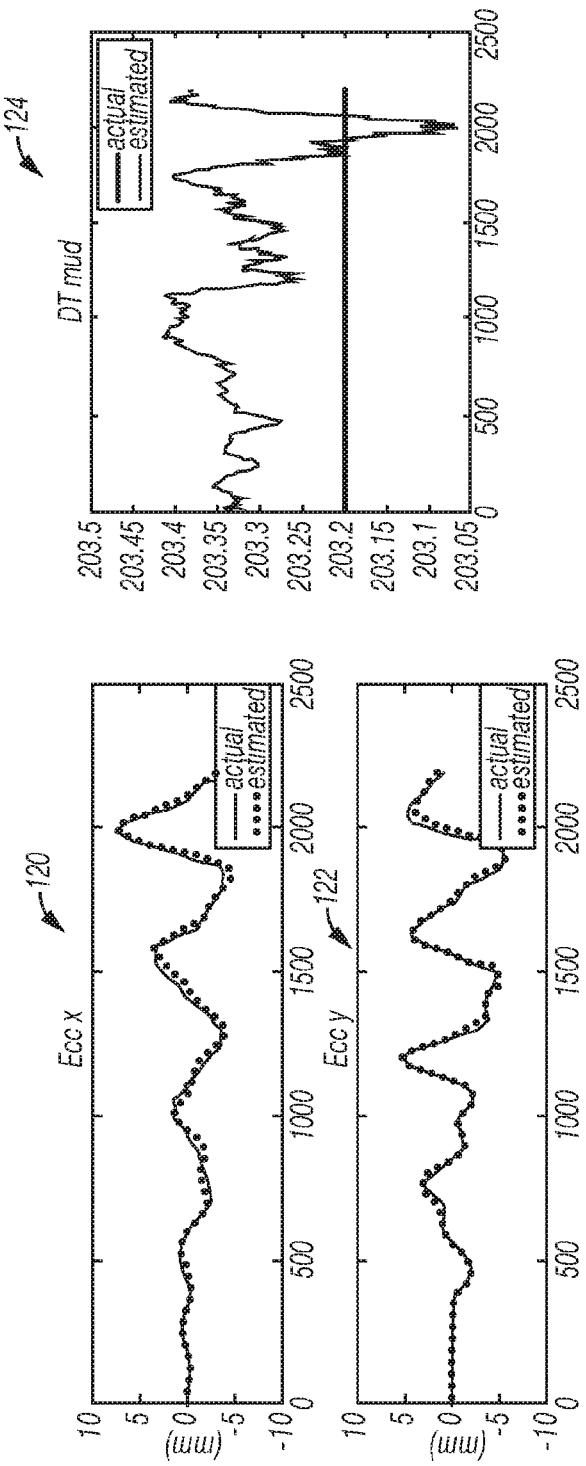
FIG. 9 are plots showing tool positioning and mud slowness in accordance with one or more example embodiments.
Figure 10:
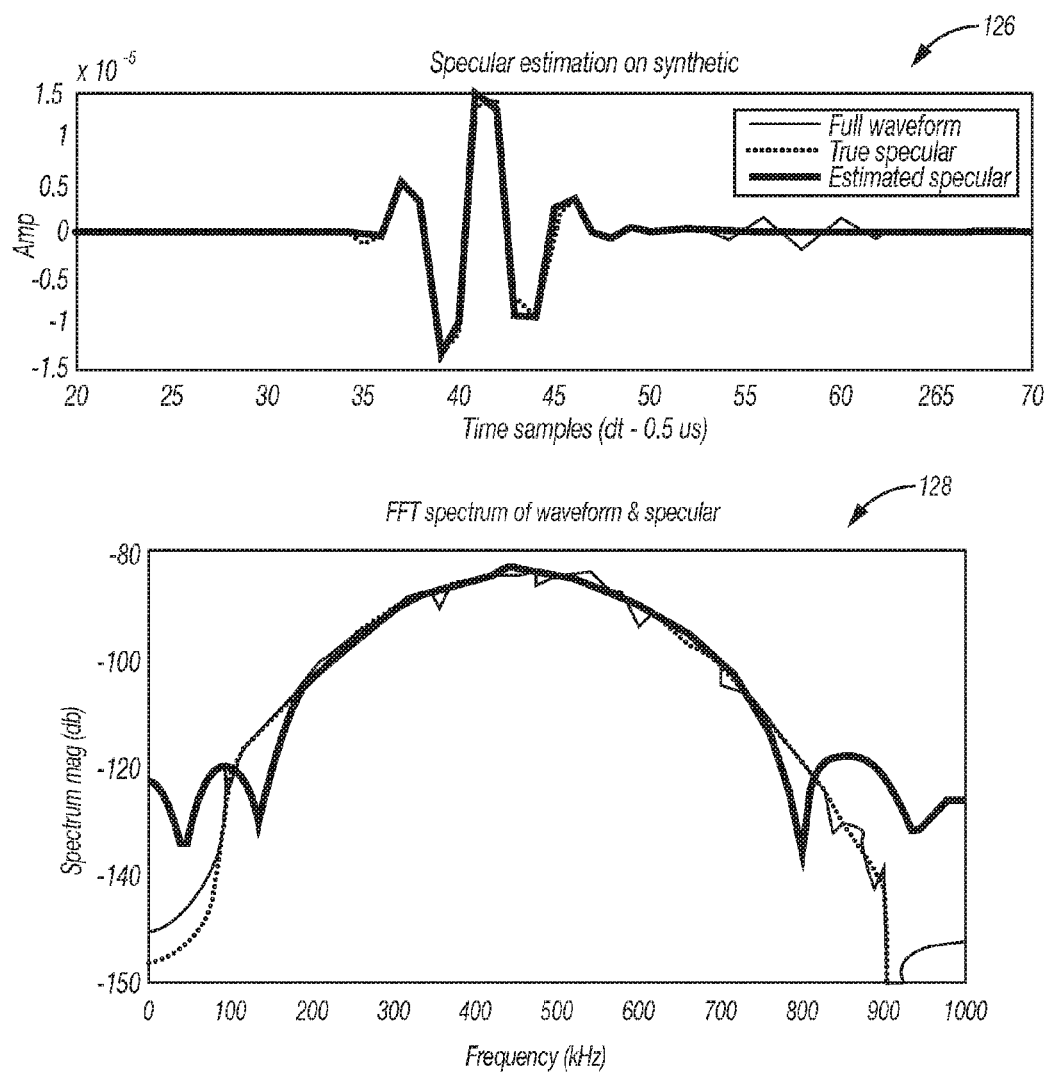
FIG. 10 are plots representing the specular estimation and Fourier spectrum of a waveform in both time and frequency in accordance with one or more example embodiments.

FIG. 9 are simulated plots showing estimates of tool eccentering and acoustic velocity of mud by applying the extended Kalman filter to the reflected wave transit time data. As shown, the estimated quantities are close to the actual quantities. Plots 120 and 122 are the coordinates (x and y, respectively) of the tool center with respect to the casing center, and plot 124 is the acoustic slowness of the mud.

In accordance with the present techniques, the estimated crude casing thickness casH and the estimated tool position and mud velocity may be input (block 81) in a three-dimensional forward model to obtain estimates for the acoustic impedance of the annular fill $Z_a$, the thickness of the casing casH, and the acoustic impedance of mud $Z_m$. Because of the more accurate casing thickness measurement and the consideration of tool eccentering and mud velocity, the initial estimates $Z_a$, casH, and $Z_m$ may be more accurate inputs for the inversion of the present techniques. The initial estimates $Z_a$, casH, and $Z_m$ may be used to calculate (block 94) a modeled waveform.

Waveform-Based Inversion for Cement Acoustic Impedance

The estimates for the acoustic impedance of the annular fill $Z_a$, the thickness of the casing casH, and the acoustic impedance of mud $Z_m$ may be input into the Levenburg-Marquardt iterative scheme 88 to converge to the estimated outputs. The workflow 80 involves computing (block 90) the model relative spectra $A_{mod}$ as well as the Jacobian $J_{mod}$ using one or more embodiments.

A first embodiment for generating a fast forward model for use in the present inversion techniques involves pre-computing a dictionary of waveforms over a grid of parameters pertinent to the model physics and covering the range of values that might be encountered in the acquisition. The model waveforms are then obtained by interpolating to the parameter values.

These model waveforms are computed for each of the $N_b$ beams selected to represent the received waveform. In some embodiments, the model waveforms may be obtained in terms of relative spectra with respect to a reference beam, which may be the specular (C0) including specular reflection from the inner wall of the casing or the first compressional echo (C2) back and forth within the casing. The compressional echo (C2) may be chosen such that the reference is based on the same physics as the rest of the beams.

Given the full set of parameters for the forward model, including φ, the time representation of the beams may be generated by the forward model as $\{b_{i,t}\}\cdot_{i=1}^{N_b}$. The frequency representation of the beams is given by $\{b_{i,f}\}\cdot_{i=1}^{N_b}$ and may be obtained by taking the Fourier transform of the time domain beams. The discrete $N_f$ point representations of these beams may be considered in the frequency band $f_{band}$. Due to the differing shear and compressional components as well as the number of reflections for the beams, each may have a unique travel time. The nominal travel time of beam $b_i$ may be denoted by $t_{b_i}$. To account for the different travel times, as well as magnitude concerns, we normalize the times and frequency magnitudes of the beams with respect to the reference to result in the $N_f$ point model spectra ($N_f \times N_b$) matrix below $$A_{mod} = \text{diag}(1 \cdot /b_{r,f})[b_{1,f} \ldots b_{Nb,f}] \circ D_{res}$$

where $b_{r,f}$ is the reference beam spectra and $D_{res}$ is a frequency delay operator that compensates for the delay in each of the beams via the Hadamard product.

With this magnitude normalization and delay compensation, the model spectra are smoothly varying functions of the parameters and so can be readily interpolated with low order polynomial functions. The Jacobians of the model beams needed for the Levenburg-Marquadt iteration may also be computed.

Another embodiment for computing the forward model involves using a fast uniform asymptotics for the CTP model. The model waveforms may be normalized and compensated prior to being used in the inversion. The model spectra obtained using candidate parameter values may then be used to fit the observed data after calibration to account for the unknown transducer response. The calibration may be obtained by computing the specular signal.

Specular Reconstruction

Figure 8:
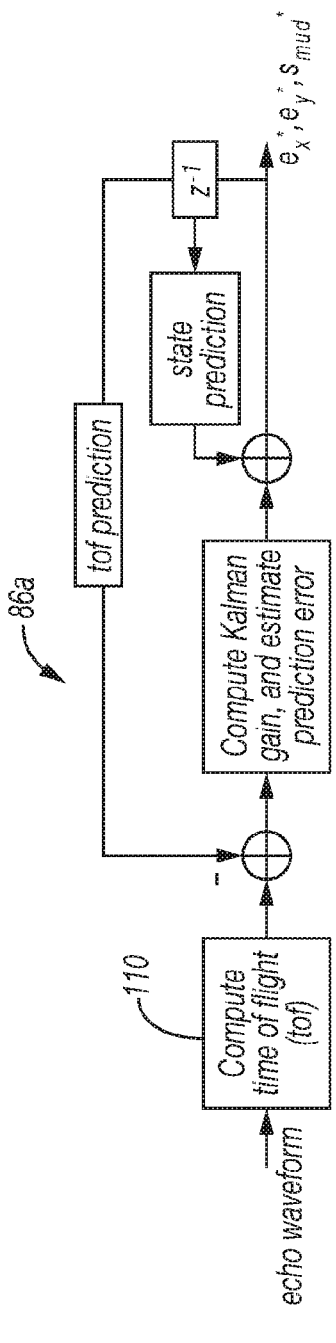
FIG. 8 is a schematic representing a Kalman filter for estimating tool positioning and mud slowness in accordance with one or more example embodiments.

The workflow 80 then involves using the model spectra $A_{mod}$ and casing thickness casH to estimate (block 92) the specular signal. In the propagatory regime, the specular signal and other echos may be compact in time and can therefore be modeled with certain processing frequency bands in terms of a time-frequency basis $E_0$. In some embodiments, the prolate functions may be used with the dimension of the basis given by the time bandwidth product. A given fraction (e.g., 0.9) of the energy in the band may also be used. Using the reconstruction operator $R_t(S) = W_t\{\text{diag}(\Sigma_{m=1}^{N_b}(D_{res,m}{}^{io}A_{mod,m}))S\}$, for model based reconstruction of specular spectrum, S, in a given window t, a least squares subspace fit for $S = E_0 c$ may be obtained by matching $R_{t_1}\{E_0 c\}$ to a window, $t_1$, around the specular. The subspace coefficients c and therefore the specular spectrum may also be obtained. FIG. 8 are two plots representing the specular signal estimation as shown by the fit in both time (plot 126) and frequency (plot 128).

Figure 11:
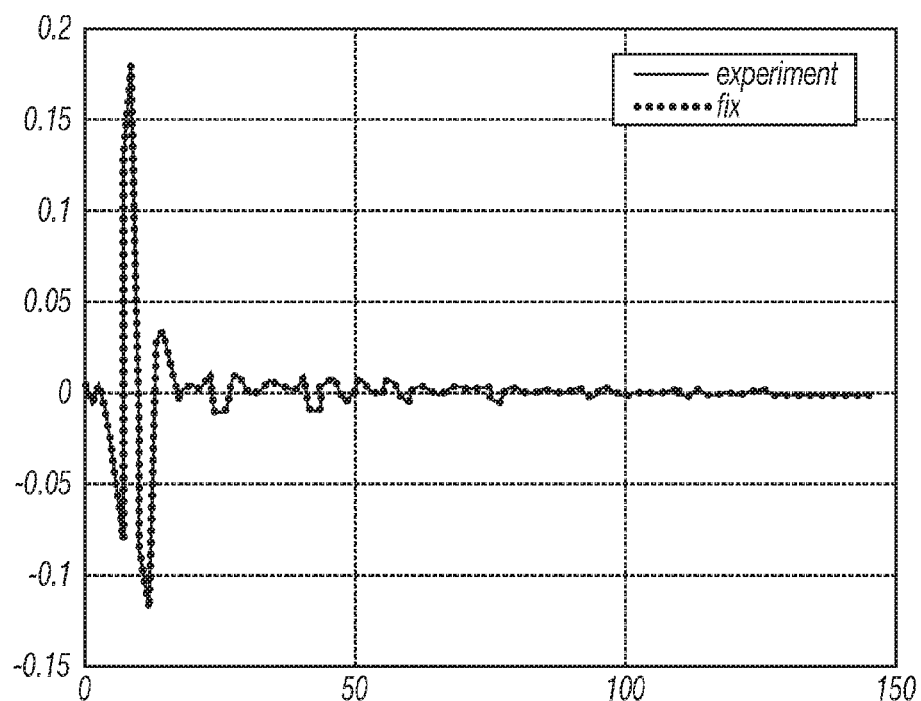
FIG. 11 is a comparison of experimental measured waveform with a calibrated and inverted waveform in accordance with one or more example embodiments.

In some embodiments, the model waveform may be further calibrated (block 94). FIG. 11 is a plot of an acoustic waveform fit with a calibrated modeled waveform indicating that the calibration substantially matched the response.

The workflow 80 then involves computing (block 96) a misfit of the reconstructed signal attribute using the reconstruction operator on $A_{mod}$ and specular signal. In some embodiments, the observed data attribute and an overall Jacobian may also be computed. The misfit and the Jacobian may then be used to compute (block 98) a parameter update to φ, and the Levenburg-Marquardt iteration 88 may be repeated until the updates meet a tolerance threshold. Once convergence is reached the inverted acoustic impedance of the annular fill $Z_a$, the thickness of the casing casH, and the acoustic impedance of mud $Z_m$ may be output 100.

Experimental Results

Figure 12:
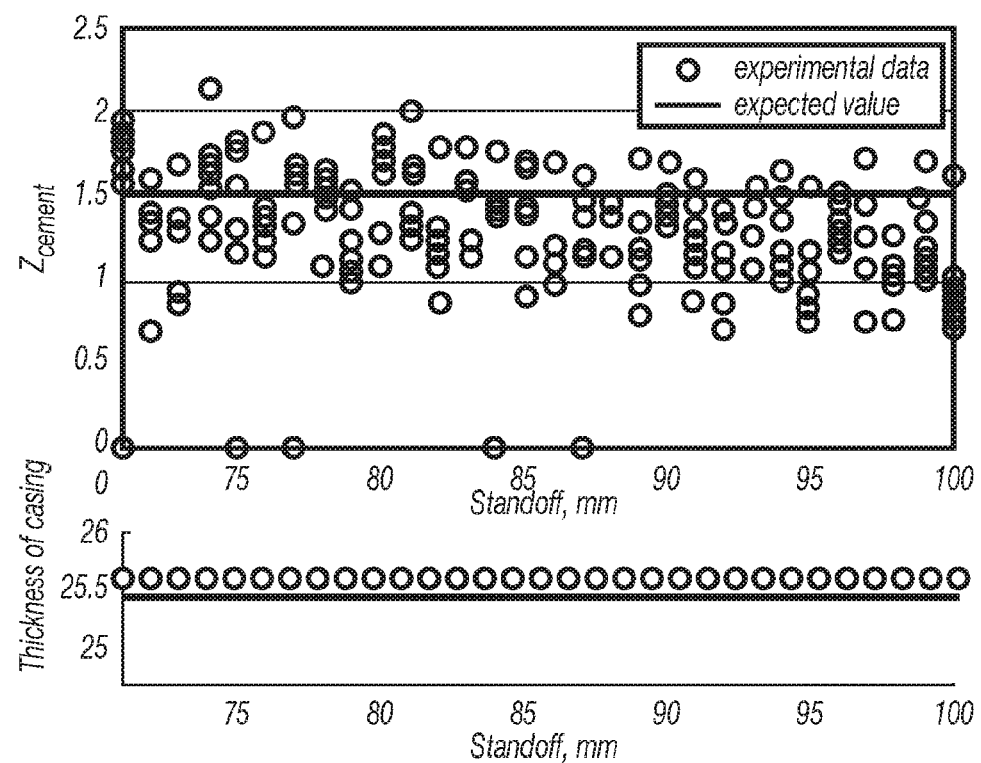
FIG. 12 is a plot of estimates of experimental data in thick casings in a range of eccentering and standoffs in accordance with one or more example embodiments.

Example results are provided in FIG. 12 to illustrate results of applying the fast forward inversion techniques to data acquired in a 16 inch casing having 25 mm thickness at a variety of standoffs and eccenterings. The inversion of casing thickness was accurate while the annular impedance was within the measurement specifications.

Any of the methods and processes described above can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of determining properties of a wellbore in a formation, the wellbore comprising a casing and an annular fill material between the casing and the formation, the method comprising:
   obtaining from an acoustic logging tool, acoustic data comprising acoustic waves reflected from the casing, the annular fill material, the formation, one or more interfaces between any of the casing, the annular fill material, and the formation, or combinations thereof;
   computing a model spectra using a forward model and based on a crude casing thickness, an initial mud acoustic impedance, and an initial annular fill acoustic impedance;
   estimating a specular signal using the model spectra and the acoustic data in a first time window;
   computing a calibrated model signal using the estimated specular signal and computed model spectra;
   computing a misfit of the computed calibrated model signal and acoustic data in a second time window comprising the initial time window;
   computing a correction update to one or more of an estimated casing thickness, an estimated apparent annular fill acoustic impedance and an estimated mud acoustic impedance, based on the misfit;
   iteratively estimating the model spectra, estimating the specular signal, computing the calibrated model signal, computing the misfit, and computing the update until the correction update is below a threshold; and
   outputting one or more of a casing thickness, an apparent acoustic impedance of the annular fill material, and the acoustic impedance of mud.

2. The method of claim 1, further comprising estimating a crude casing thickness, a tool position, and a sound velocity in mud between the acoustic logging tool and the casing, or combinations thereof, based on the acoustic data.

3. The method of claim 2, wherein the crude casing thickness is determined based on a resonant frequency of the acoustic data.

4. The method of claim 3, wherein estimating the crude casing thickness is based on $$f_{res} \sim \frac{v_{p,cas}}{2\,casH}$$

where $f_{res}$ is the resonant frequency, $V_{p,cas}$ is a compressional wave velocity of the casing, and casH is the casing thickness.

5. The method of claim 3, wherein computing the crude casing thickness is determined based on time delays between successive echoes in the data.

6. The method of claim 2, wherein the estimated tool position, the estimated mud sound velocity, or both, are estimated based on a time of flight estimation based on a time envelope of an initial reflection from an inner surface of the casing.

7. The method of claim 2, wherein the estimated tool position, the estimated mud sound velocity, or both, are estimated using a Kalman filter.

8. The method of claim 1, wherein estimating the model spectra comprises computing a table of waveforms over a plurality of model parameters comprising the crude casing thickness, an estimated tool position, an estimated sound velocity of mud between the acoustic logging tool and the casing, the initial annular fill acoustic impedance, the initial mud acoustic impedance, a casing diameter, material properties of the casing, material properties of the annular fill, and combinations thereof.

9. The method of claim 1, wherein estimating the model spectra and the Jacobian curve is based on the relationship below:

$$A_{mod} = \mathrm{diag}(1 \cdot /b_{r,f})[b_{1,f} \ldots b_{Nb,f}] \circ D_{res}$$

where $b_{r,f}$ is a reference spectra and $D_{res}$ is a frequency delay operator that compensates for a delay in the reference spectra and the model spectra.

10. The method of claim 1, wherein estimating the specular signal comprises reconstructing the specular signal over the time window using the relationship below:

$$R_t(S) = W_t \left\{ \mathrm{diag}\left( \sum_{m=1}^{N_b} (D^i_{res,m} \circ A_{mod,m}) \right) S \right\}$$

where S is the specular signal in a time window t.

11. The method of claim 1, wherein computing the specular signal comprises using a smoothing function.

12. The method of claim 1, further comprising computing a calibrated model waveform based on the estimated specular signal.

13. A method comprising:
   measuring an acoustic waveform at an acoustic transducer in a wellbore comprising casing and annular material, wherein the measured acoustic waveform is a reflection from the wellbore;
   computing a crude casing thickness by processing the acoustic waveform;
   determining an initial mud acoustic impedance of mud between the acoustic transducer and the casing and an initial annular fill acoustic impedance of the annular material;

using the estimated crude casing thickness, the initial mud acoustic impedance, and the initial annular fill acoustic impedance in a forward modeling to calculate a model spectra;

using the model spectra to calculate a specular signal;

using the model spectra and the specular signal to calculate a calibrated model signal;

using the model spectra and the calibrated model signal to compute a misfit of the calibrated model signal;

using the misfit to compute an update to one or more of the estimated casing thickness, the initial mud acoustic impedance, and the initial annular fill acoustic impedance; and outputting one or more of a thickness of the casing, an apparent acoustic impedance of the annular fill material, and the acoustic impedance of mud once the computed update is below a threshold.

14. The method of claim 13, further comprising outputting one or both of an apparent mud acoustic impedance and an apparent annular acoustic fill impedance once the computed update is below a threshold.

15. The method of claim 13, further comprising iteratively using the estimated crude casing thickness, the initial mud acoustic impedance, and the initial annular fill acoustic impedance in the forward modeling to calculate the model spectra, using the model spectra to calculate the specular signal, using the model spectra and the specular signal to calculate the calibrated model signal, using the model spectra and the calibrated model signal to compute the misfit, and using the misfit to compute the update, until the update is below a threshold.

16. A non-transitory computer-readable medium storing computer-executable instructions, that when executed by at least one processor, causes the at least one processor to perform the following:

inputting, from an acoustic tool deployed in a wellbore comprising casing and annular fill, a measured waveform comprising one or more reflected acoustic waves;

estimating, using the measured waveform, a crude thickness of the casing and a positioning of the acoustic tool;

estimating an initial mud impedance of mud between the acoustic tool and the casing and an initial annular fill acoustic impedance;

using forward modeling to estimate, based on the crude thickness of the casing and the positioning of the acoustic tool, an estimated casing thickness, an estimated annular fill acoustic impedance, and an estimated mud acoustic impedance;

modeling a modeled spectra based on the estimated casing thickness, the estimated annular fill acoustic impedance, and the estimated mud acoustic impedance;

computing a specular signal based on the modeled spectra and estimated casing thickness;

computing a misfit of the specular signal using a reconstruction operator on the modeled spectra;

computing an update to the estimated casing thickness based on the computed misfit;

update the casing thickness; and output one or more of a calibrated casing thickness, an apparent acoustic impedance of the annular fill material, and the acoustic impedance of mud.

17. The non-transitory computer-readable medium of claim 16, further comprising outputting an apparent annular fill acoustic impedance and apparent mud acoustic impedance.

18. The non-transitory computer-readable medium of claim 16, further comprising iteratively modelling the modeled spectra, computing the specular signal, computing the misfit, and computing the update until the update is below a threshold.

19. The non-transitory computer-readable medium of claim 16, further comprising computing a calibrated model signal using the specular signal and the model spectra, and wherein computing the misfit comprises using the calibrated model signal.

20. The non-transitory computer-readable medium of claim 16, further comprising computing a Jacobian curve, and wherein computing the update is further based on the Jacobian curve.

* * * * *